Oct. 11, 1927. 1,644,937

F. A. MILLIFF ET AL

VAPORIZER

Filed Jan. 11, 1926  3 Sheets-Sheet 2

Inventors:
Frank A. Milliff,
and John A. Milliff,
By Fad W Lewis
Attorney.

Oct. 11, 1927.

F. A. MILLIFF ET AL 1,644,937

VAPORIZER

Filed Jan. 11, 1926

Inventors:
Frank A. Milliff,
and John A. Milliff,
By Fad Alaurie
Attorney.

Patented Oct. 11, 1927.

1,644,937

UNITED STATES PATENT OFFICE.

FRANK A. MILLIFF AND JOHN A. MILLIFF, OF LOS ANGELES, CALIFORNIA.

VAPORIZER.

Application filed January 11, 1926. Serial No. 80,581.

Our invention relates to petroleum refining apparatus and more particularly to an apparatus in which the oil is first heated in a pipe still or the like and then passed to a vaporizer in which the vapors are separated therefrom.

In the usual form of such apparatus, the petroleum is heated in the pipe still to a temperature above the boiling point of the least volatile of the hydrocarbons which it is desired to remove in the first distillation. The mixture of oil and vapors so produced is then passed into a vaporizer in which the vapors of certain of the hydrocarbons are separated from the residuum, being then passed to suitable condensing elements in which they may be fractionally condensed to produce various commercial products.

In the past one of the chief difficulties experienced by refiners in the operation of such vaporizers was that they were not susceptible of close control in order to limit the end boiling points of the vapor mixture separated therein. Moreover, an undesirable dephlegmating action took place in the lower stage of the vaporizer which caused some of the more volatile hydrocarbons to be re-absorbed and to pass out with the residuum with consequent loss in values.

A further difficulty in the operation of the previous forms of vaporizers arose from the tendency of material having a higher boiling point than the desired vapor product to carry over as mist in the form of minute droplets with the separated more volatile vapors. This is objectionable as it results in a condensate having a higher end boiling point than is desired.

It is an object of our invention to provide a vaporizer for use in the refining of petroleum oils, in which the desired vapors are separated from the residuum with an extremely small amount of the more volatile and valuable hydrocarbons remaining in the residuum.

It is a further object of our invention to provide a vaporizer for use in the refining of petroleum oils in which the characteristics of the vapor taken therefrom are capable of close control.

A further object of our invention is to provide a vaporizer in which any mist-like particles are separated from the vapor stream and returned to the vaporizer for re-treatment.

A further object of our invention is to provide a vaporizer having a series of horizontally disposed drip screens through which a vertical passageway is provided for collecting the vapors given off between the screens.

Another object is to provide a re-boiling vat below the evaporating screens for the purpose of re-boiling the residuum and driving off more volatile hydrocarbons therefrom before the residuum is drawn off from the vaporizer.

A further object is to provide a dephlegmating unit in the top of the vaporizer for removing mist-like particles of unvaporized material and knocking down less volatile vapors than those desired to be included in the vapor mixture leaving the vaporizer.

A still further object is to provide a novel hot crude oil distributing element for absorbing the energy of movement of the crude oil when discharged into the vaporizer and equally distributing it over the horizontal drip screens.

Another object is to provide a centrifuge or centrifugal separator for removing liquids leaving the vaporizer entrained in the vapor and returning them to the vaporizer.

Another object of our invention is to provide a drip screen of simple construction, which is cheaply constructed, easily installed, and which will lie in a true horizontal plane when installed.

Another object is to provide heating and draft accelerating jets at various points in the vertical vapor passageway for heating the vapor, and creating a suction from the spaces between the drip screens around the vertical passageway.

Further objects and advantages will be made apparent in the following description and claims and in the accompanying drawings, in which Fig. 1 is a diagrammatic view of a portion of a typical petroleum refining apparatus, illustrating the use of our improved vaporizer.

Fig. 6 is a sectional view taken on the line 6—6 of Fig. 2.

Fig. 7 is a plan view of a dephlegmator unit screen with the screen partially broken away to show the frame thereof.

Fig. 8 is a vertical sectional view showing the construction of the novel centrifuge which is a part of our vaporizer.

Figure 1:
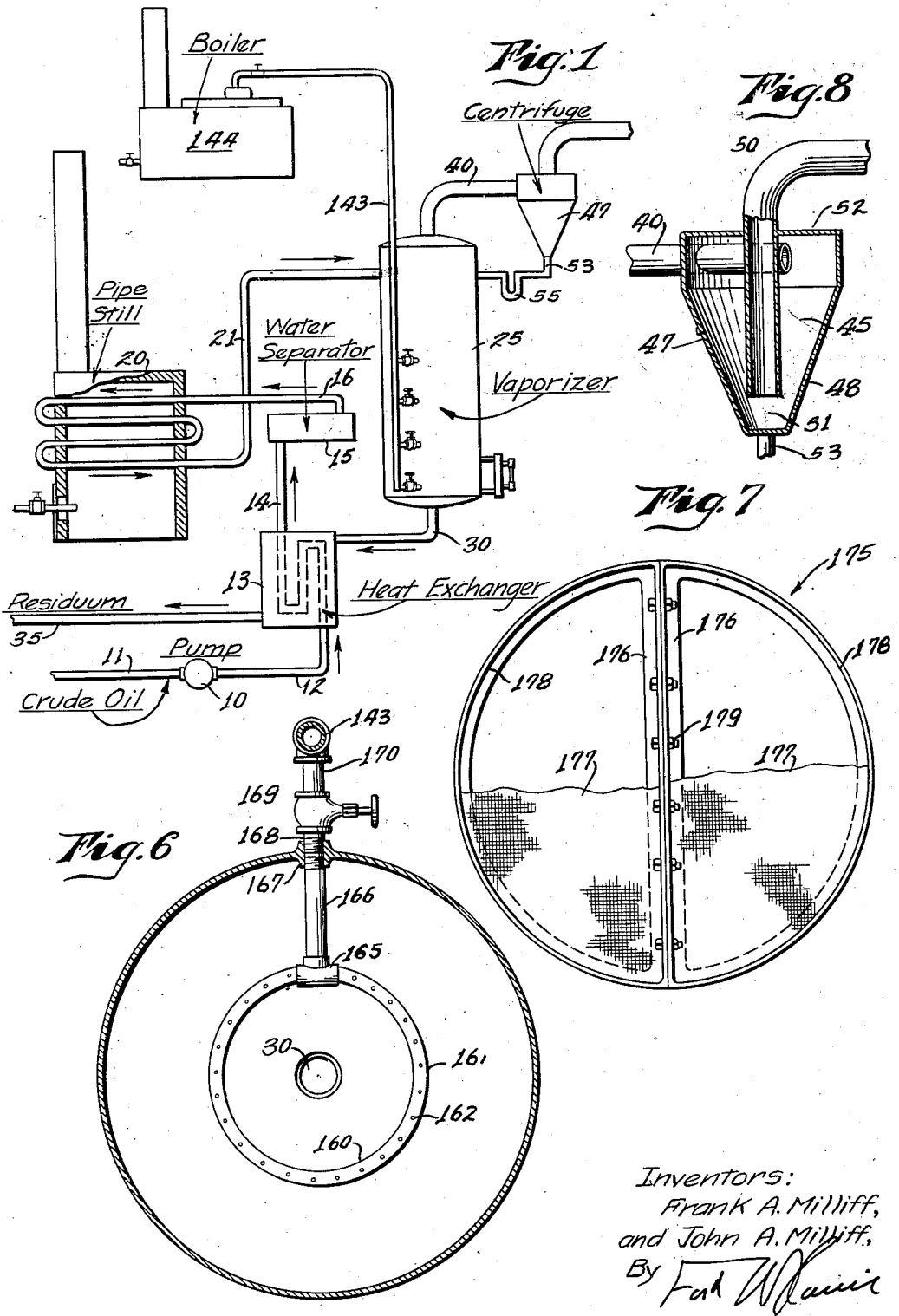

Referring to the drawings in detail, Fig. 1 shows a crude oil pressure pump 10 drawing crude oil through a pipe 11 from a crude oil tank (not shown) and forcing it through a pipe 12, through a heat exchanger 13, a pipe 14, and a water separator 15, from which a pipe 16 leads the crude oil to a pipe still 20. Leading from the still 20, a pipe 21 conducts the heated crude oil and vapors formed therein by heating to the vaporizer 25 embodying our present invention.

The vaporizer 25 has a main cylindrical shell 26, from the bottom end of which a cylindrical apron 27 extends downwardly to provide a support for the vaporizer. Secured in the apron 27 is a bottom plate 28 having a central opening 29, from which a residuum outlet pipe 30 leads to the heat exchanger 13. Cool residuum is led from the heat exchanger 13 to a storage tank (not shown) by a pipe 35.

A cover 36 closes the upper end of the shell 26 and is secured thereto by flanges 37 and 38. A vapor outlet pipe 40 leads upwardly from an opening 41 in the center of the cover 36, and enters tangentially the upper portion of the separating chamber 45 of a centrifuge 47 through an inverted conical shell 48 thereof.

An outlet pipe 50 is disposed vertically in the center of the chamber 45 and leads from a short distance above the bottom 51 of the shell 48 out through the top 52 thereof. A liquid return pipe 53 leads from the bottom 51 through a gas trap 55 to the shell 26.

Figure 3:
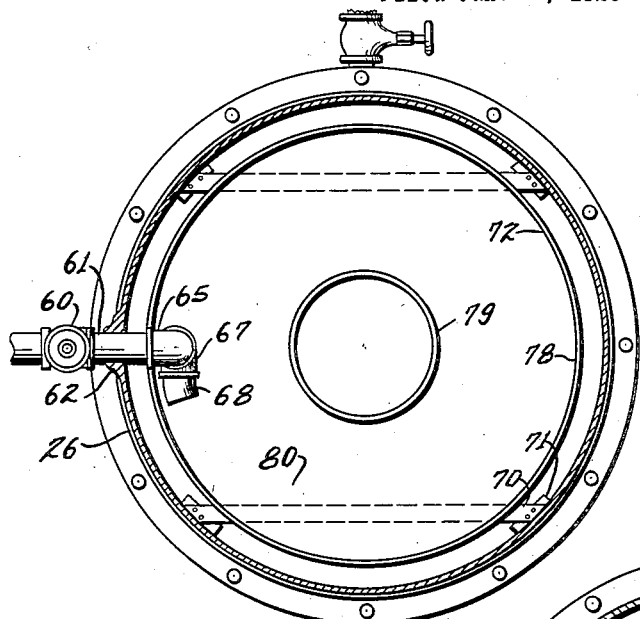
Fig. 3 is a sectional view taken on the line 3—3 of Fig. 2.
Figure 4:
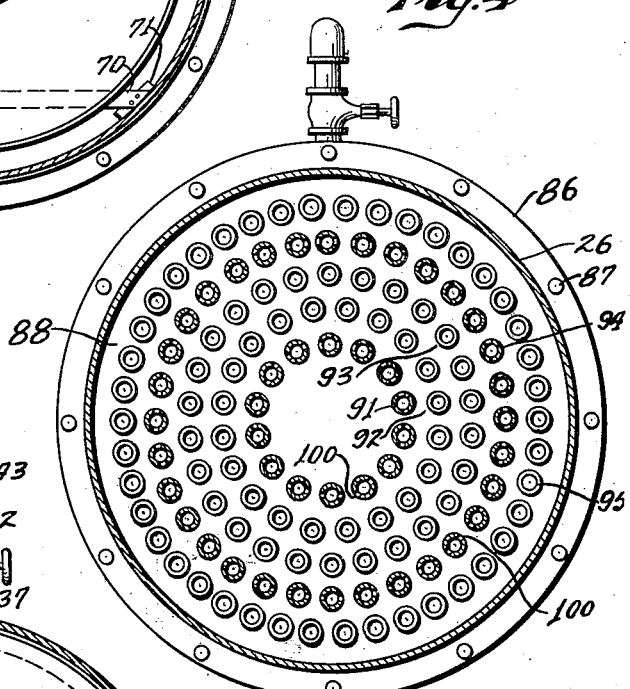
Fig. 4 is a sectional view taken on the line 4—4 of Fig. 2.

The hot crude oil line 21 connects with a valve 60 which connects to a nipple 61 which passes through and is secured in an opening 62 in the shell 26 a short distance from the upper end thereof. Inside the shell 26 an elbow 65 is secured to the nipple 61 and connects through a nipple 66 to an elbow 67 which has a nozzle nipple 68 projecting therefrom in a direction tangential to the shell 26, as shown in Fig. 3.

Supported in a perfectly level position on cross bars 70, which attach at their ends to brackets 71 fixed upon the inside face of the shell 26, and disposed concentrically within said shell and directly beneath the opening 62, is a crude oil impact absorber and distributing pan 72.

This pan 72 has a flat annular floor 75, from the outer and inner edges of which arise cylindrical walls 78 and 79. The outer wall 78 is higher than the inner wall 79 and reaches substantially to the level of the opening 62. The elbow 65 turns downwardly inside the wall 78 so that the nozzle 68 lies in the pan 72 close to the junction between the wall 78 and the floor 75 and opens in a direction tangential to the annular basin 80 formed upon the floor 75 by the walls 78 and 79.

The shell 26 is divided at 85, a short distance below the pan 72, opposing edges of the shell 26 having flanges 86 which are clamped by bolts 87 upon a distributing deck plate 88. The joint 85 is made so that the deck plate 88 will set perfectly level. Welded into suitable holes in the plate 88 are short pipes 90 arranged in concentric circular rows 91, 92, 93, 94 and 95. The pipes 90 in the rows 92, 93 and 95 rise to a uniform height above the plate 88. The pipes 90 in the rows 91 and 94 are substantially twice the height of the pipes 90 in the rows of pipes 92, 93 and 95; and the former have openings 100 formed in their walls on the same level as the upper ends of the rows of pipes 92, 93 and 95.

An overflow pan 101, having a flat bottom plate 102 and low side walls 103 rising therefrom at the outer edge, rests upon and is secured to the upper ends of the rows of pipes 91 and 94. When the overflow pan 101 is thus secured, there is only a small space between the upper edge of the wall 103 and the floor 75 of the annular pan 72.

Figure 2:
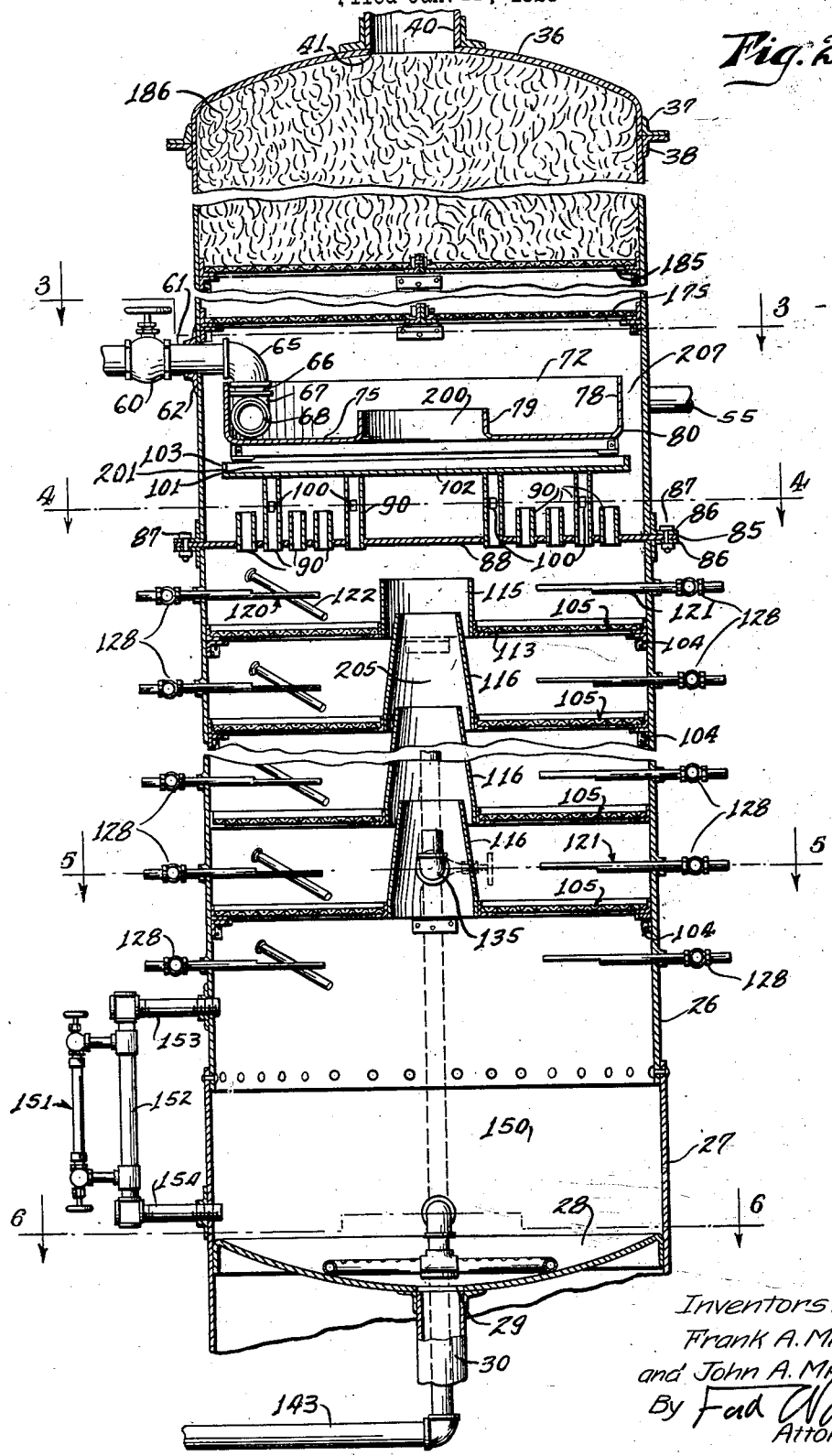
Fig. 2 is a fragmentary vertical medial sectional view of the vaporizer of our invention.
Figure 5:
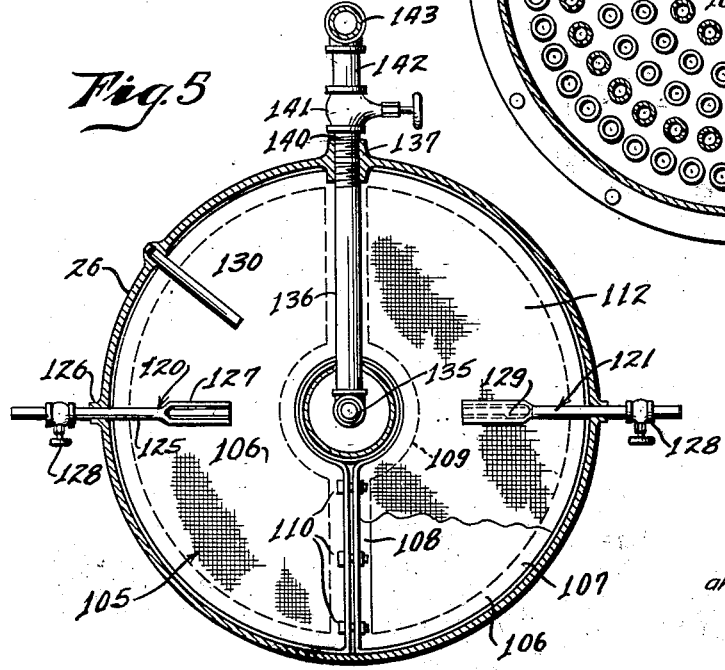
Fig. 5 is a sectional view taken on the line 5—5 of Fig. 2.

Supported horizontally on brackets 104 formed on the inner surface of the shell 26, beneath the crude oil distributing plate 88, is a series of uniformly spaced drip screens 105. As shown in Figs. 2 and 5, each of these screens 105 has a pair of opposed semicircular angle iron frame halves 106, each of which halves comprises a semi-circular peripheral portion 107 and a diametral portion 108, the latter being bent at the middle to form a small semi-circular portion 109. A substantially semi-circular screen 112 is cut to fit within each of the frame halves 106, and bolts 110 passing through the vertical flanges of the diametral portions 108 of opposing frame halves 106 secure the two halves together to form a drip screen 105.

Gripped at its lower end within the circular frame formed by the semi-circular portions 109, when the frame halves 106 are joined by the bolts 110 to form the top drip screen 113 of the drip screens 105 is a short cylindrical tube 115. In all the lower screens 105, longer tapered tubes 116 are similarly gripped and held in place. The tubes 116 are of such length that the upper end of each extends a short distance up into the lower end of the tube in the screen immediately above, as shown in Fig. 2.

Passing through the shell 26 into the space immediately beneath each screen 105 is a valved oil sampler 120, a valved vapor sampler 121, and a thermometer well 122. Each oil sampler 120 comprises a pipe 125 which passes through a nipple 126 formed in the shell 26 and extends a distance into the vaporizer. A portion of the inner end of the pipe 125 is split along the top and the sides opened out, as shown in Fig. 5, to form an oil collecting spoon 127 which faces upwardly. Outside the shell 26 the pipe 125 has a valve 128.

The vapor sampler 121 is identical in construction and manner of mounting with the oil sampler 120, excepting that the collecting spoon 127 thereof is for collecting vapor instead of oil and consequently is turned downwardly instead of upwardly.

The thermometer well 122 comprises a tube 130 which is open at the outer end, at which it passes through and is welded to the shell 26, and which extends obliquely downwardly into the vaporizer 25 and is closed at its lower end. This tube is kept filled with light lubricating oil.

Steam jets 135 are disposed in some of the tapered tubes 116 so as to point upwardly. Each of these is supported and supplied with steam by a pipe 136 which threads into a coupling 137 provided in the shell 26, and which communicates through a nipple 140, a valve 141 and a nipple 142 with a steam manifold line 143. Steam is supplied to the manifold line 143 from a boiler 144.

A series of twelve to thirty or more of the screens 105 is provided in the vaporizer 25, as shown fragmentarily in Fig. 2. Beneath the lowermost screen 105 is a re-boiling vat 150 having the plate 28 as a bottom and the apron 27 as sides.

A standard liquid level gage 151 communicates with a vertical pipe 152 which communicates at the top and bottom ends thereof through pipes 153 and 154 with the re-boiling vat 150, so that the level of liquid in the vat will be indicated by the gage 151.

Lying in a central position upon the floor 28 of the re-boiler 150 is a live steam heating element 160. This element is formed of a circular pipe 161 perforated at 162 on its upper face. Opposite ends of the pipe 161 are welded into opposite ends of a T-fitting 165 which communicates through a pipe 166, a threaded coupling 167 provided in the apron 27, a nipple 168, a valve 169 and a nipple 170, with the steam line 143.

In the shell 26, just above the opening 62, is a horizontal screen 175. This screen is mounted in the same manner as the screens 105, and as shown in Fig. 7 is identical in structure therewith excepting that the diametral cross bars 176 are straight throughout their length and the screens 177 are cut to fit the frame halves 178 and lie flat therein. The cross bars 176 are securely bound together by bolts 179.

Mounted in the shell 26 about one-half its diameter above the screen 175 and an equal distance below the top of the shell 26 is an identically similar screen 185. This screen 185 supports a mass of dephlegmating steel turnings or kinked wire 186, which fills the space above the screen 185 up to the opening 41 in the vaporizer cap 36.

The operation of our improved vaporizer when operating upon a certain grade of California oil is as follows:

The hot oil from the pipe still 20 enters the vaporizer 25 at about 500° F. through the pipe 21, the valve 60, the nipple 61, the elbow 67 and is projected from the nozzle 68 tangentially into the annular pan 72. Under certain conditions of operation, this oil will contain bubbles of vapors produced by distillation from the oil in the pipe still 20. The mixture thus discharged rapidly fills the annular basin 80 in this pan and overflows the wall 79, passing downwardly through the opening 200 surrounded thereby into the overflow pan 101. The tangential discharge of oil and vapor through the nozzle 68 also causes a rapidly rotating current in the annular basin 80. The wall 78, however, is of such height that the liquid will not build up sufficiently against it, due to the centrifugal force, to overflow this wall, but instead will overflow entirely through the opening 200. In this rapidly rotating mass of liquid the kinetic energy of the incoming oil is absorbed, and opportunity is now given for a uniform distribution of the liquid with its entrained vapor bubbles over the entire cross sectional space of the vaporizer. This is accomplished by the flowing of the mixture over the outer wall 201 of the pan 101 upon the distributing deck 88.

The level of liquid on the deck 88 rises until it is above the tops of the pipes 90 in the rows 92, 93 and 95, which level is also above the bottoms of openings 100 in the other pipes 90. Thus the rising mixture flows equally down through all of the pipes 90 and causes a uniform distribution of the mixed oil and vapor over the top drip screen 113. The mixture then drips uniformly from this screen to the screen 105 below it, and so on through the whole series of screens 105.

As the hot mixture is caused to spread in a thin film over the wire in each successive screen 105, the hydrocarbon liquids contained therein which have lower boiling points than the temperature of the liquid are given off as vapors. These vapors are drawn off from the space above each screen into the lower end of the tapered tube 116 of the screen next above, and pass into a vertical vapor collecting passageway 205 formed by the series of tubes 116. The vapor passes up through this passageway 205 and out through the tube 115 directly underneath the deck plate 88. From here the vapors pass upwardly through the tubes 90 and through the space 207, between the walls 78 and the shell 26. Above the pan 72 the vapors pass through the screen 175, the screen 185, the mass of dephlegmating material 186 and out from the vaporizer through the vapor line 40.

When it is desired to accelerate this vapor passage, steam is admitted through the valves 141 to the nozzles 135. The resulting jets of steam directed upwardly in the passageway 205 draw an increased amount of vapor from the surrounding space and cause a substantial increase of vapor pressure above the topmost screen 113. This last effect results in vapor blowing downwardly through the screen 113 and the other screens 105, which assists in the separation of the more volatile constituents of the mixture coating the screens.

The dephlegmating unit comprising the screens 175 and 185, and the mass of steel turnings 186, condenses and collects any vapors heavier than those desired to pass out with the vapor mixture. These condensates drop down and pass through the vaporizer with the fresh influx of oil, eventually finding their way into the re-boiler 150 with the residuum.

The residuum is drawn off through the pipe 30 at such a rate as to maintain the level in the re-boiler 150 where it will be visible in the gage 151. Frequent tests are made of the initial boiling point of the residuum thus drawn off, and if any test shows that products desired to be vaporized are passing out of the vaporizer with the residuum, the valve 169 is opened and live steam admitted into the residuum in the re-boiler 150 through the perforated pipe 160. This re-boils the residuum and lowers the partial vapor pressure therein, causing the more volatile hydrocarbons to be vaporized from the residuum.

The nature of the oil, the nature of the vapor and the temperature of the vaporizer may be noted beneath any or all the drip screens 105 at regular intervals during the operation of the vaporizer, or only when special grades of crude oil are being run. To obtain an oil sample from any oil sampler 120, the valve 128 thereof is opened and the oil collecting in the spoon 127 will run out through the pipe 125 into a receptacle (not shown) held to receive it. A vapor sample from any vapor sampler 121 may be obtained in a similar manner. An open-mouthed vessel is inverted and placed above the outer end of the pipe 125 of a vapor sampler 121 and with the mouth of the vessel communicating therewith. The valve 128 thereof will then be opened. Vapor rising inside the vaporizer 25 will be collected by the vapor spoon 129, pass through the vapor sampler 121 and rise into the receiving vessel. When the vessel is full of vapor, it should be quickly closed and the valve 128 shut off.

To test the temperature, a thermometer is placed in the oil in a well 122 and removed after a sufficient period of time for reading.

The centrifuge 47 is not essentially a part of the vaporizer 25 but has proved to be a valuable accessory used in conjunction therewith, when certain classes of crude oil are being run.

The centrifuge 47 is combined with the vaporizer 25 for the removal of any particles of liquid which may be mechanically entrained in the vapors leaving the vaporizer and returning these liquids for further treatment in the vaporizer. This separation of liquids from the vapor mixture is accomplished by the centrifugal force set up by rapid rotation of the vapors in the centrifuge.

It will thus be seen that we have produced a hydrocarbon vaporizer or vapor separator which permits of perfect control of vaporization in such manner as to keep the initial boiling point of the residuum above a predetermined minimum and the end point of the liquids vaporized below a predetermined maximum. Also the means for accelerating the flow of vapors through the collecting passageway 205 increases the activity of the vaporizer and greatly increases the efficiency and capacity of a unit of given size. The testing means at different stages of the descent of oil through the vaporizer also permits keeping perfect control of the process and maintaining its operation at the highest possible efficiency.

We claim as our invention:

1. A vapor separator comprising: a shell; means for admitting hot oil into the top portion of said shell; a series of foraminous members secured in said shell; means for distributing said incoming hot oil uniformly over said foraminous members; a series of sleeve members, each centrally secured to one of said foraminous members and extending upwardly therefrom into a sleeve of the next higher foraminous member; and means for withdrawing vapor from the topmost of said sleeves.

2. A vapor separator comprising: a shell; means for admitting hot oil into the top portion of said shell; a series of foraminous members secured in said shell; means for distributing said incoming hot oil uniformly over said foraminous members; a series of sleeve members, each centrally secured to one of said foraminous members and extending upwardly therefrom into a sleeve of the next higher foraminous member; means for artificially producing an upward draft through said sleeves; and means for withdrawing vapor from the topmost of said sleeves.

3. A vapor separator comprising: a shell;

means for admitting hot oil into the top portion of said shell; a series of foraminous members secured in said shell; means for distributing said incoming hot oil uniformly over said foraminous members; a series of sleeve members, each centrally secured to one of said foraminous members and extending upwardly therefrom into a sleeve of the next higher foraminous member; steam jets so situated as to produce an upward draft through said sleeves; and means for withdrawing vapor from the topmost of said sleeves.

4. A vapor separator comprising: a shell; means for admitting hot oil into the top portion of said shell; a series of foraminous members secured in said shell; means for distributing said incoming hot oil uniformly over said foraminous members; means for maintaining a body of residuum in the bottom of said shell below the lowest of said members; means for heating said body of residuum; a series of sleeve members, each centrally secured to one of said foraminous members and extending upwardly therefrom into a sleeve of the next higher foraminous member; and means for withdrawing vapor from the topmost of said sleeves.

5. A vapor separator comprising: a shell; means for admitting hot oil into the top portion of said shell; a series of foraminous members secured in said shell; means for distributing said incoming hot oil uniformly over said foraminous members; means for maintaining a body of residuum in the bottom of said shell below the lowest of said members; means for heating said body of residuum; a series of sleeve members, each centrally secured to one of said foraminous members and extending upwardly therefrom into a sleeve of the next higher foraminous member; means for artificially producing an upward draft through said sleeves; and means for withdrawing vapor from the topmost of said sleeves.

6. A vapor separator comprising: a shell; means for admitting hot oil into the top portion of said shell; a series of foraminous members secured in said shell; means for distributing said incoming hot oil uniformly over said foraminous members; means for maintaining a body of residuum in the bottom of said shell below the lowest of said members; means for heating said body of residuum; a series of sleeve members, each centrally secured to one of said foraminous members and extending upwardly therefrom into a sleeve of the next higher foraminous member; steam jets so situated as to produce an upward draft through said sleeves; and means for withdrawing vapor from the topmost of said sleeves.

7. A vapor separator comprising: a shell; means for admitting hot oil into the top portion of said shell; a series of foraminous members secured in said shell; means for distributing said incoming hot oil uniformly over said foraminous members; means for maintaining a body of residuum in the bottom of said shell below the lowest of said members; a steam pipe so placed as to inject steam into said body of residuum for heating said body of residuum; a series of sleeve members, each centrally secured to one of said foraminous members and extending upwardly therefrom into a sleeve of the next higher foraminous member; and means for withdrawing vapor from the topmost of said sleeves.

8. A vapor separator comprising: a shell; means for admitting hot oil into the top portion of said shell; a series of foraminous members secured in said shell; means for distributing said incoming hot oil uniformly over said foraminous members; means for maintaining a body of residuum in the bottom of said shell below the lowest of said members; a steam pipe so placed as to inject steam into said body of residuum for heating said body of residuum; a series of sleeve members, each centrally secured to one of said foraminous members and extending upwardly therefrom into a sleeve of the next higher foraminous member; means for artificially producing an upward draft through said sleeves; and means for withdrawing vapor from the topmost of said sleeves.

9. A vapor separator comprising: a shell; means for admitting hot oil into the top portion of said shell; a series of foraminous members secured in said shell; means for distributing said incoming hot oil uniformly over said foraminous members; means for maintaining a body of residuum in the bottom of said shell below the lowest of said members; a steam pipe so placed as to inject steam into said body of residuum for heating said body of residuum; a series of sleeve members, each centrally secured to one of said foraminous members and extending upwardly therefrom into a sleeve of the next higher foraminous member; steam jets so situated as to produce an upward draft through said sleeves; and means for withdrawing vapor from the topmost of said sleeves.

10. A vapor separator comprising: a shell; means for admitting hot oil into the top portion of said shell; a series of foraminous members secured in said shell; means for distributing said incoming hot oil uniformly over said foraminous members; a series of sleeve members, each centrally secured to one of said foraminous members and extending upwardly therefrom into a sleeve of the next higher foraminous member; a mass of metallic material having small continuous passages therethrough situated above said means for admitting hot oil into the top of said shell; and means for withdrawing vapor from above said mass.

11. A vapor separator comprising: a shell; means for admitting hot oil into the top portion of said shell; a series of foraminous members secured in said shell; means for distributing said incoming hot oil uniformly over said foraminous members; a series of sleeve members, each centrally secured to one of said foraminous members and extending upwardly therefrom into a sleeve of the next higher foraminous member; means for artificially producing an upward draft through said sleeves; a mass of metallic material having small continuous passages therethrough situated above said means for admitting hot oil into the top of said shell; and means for withdrawing vapor from above said mass.

12. A vapor separator comprising: a shell; means for admitting hot oil into the top portion of said shell; a series of foraminous members secured in said shell; means for distributing said incoming hot oil uniformly over said foraminous members; a series of sleeve members, each centrally secured to one of said foraminous members and extending upwardly therefrom into a sleeve of the next higher foraminous member; steam jets so situated as to produce an upward draft through said sleeves; a mass of metallic material having small continuous passages therethrough situated above said means for admitting hot oil into the top of said shell; and means for withdrawing vapor from above said mass.

13. A vapor separator comprising: a shell; means for admitting hot oil into the top portion of said shell; a series of foraminous members secured in said shell; means for distributing said incoming hot oil uniformly over said foraminous members; means for maintaining a body of residuum in the bottom of said shell below the lowest of said members; means for heating said body of residuum; a series of sleeve members, each centrally secured to one of said foraminous members and extending upwardly therefrom into a sleeve of the next higher foraminous member; a mass of metallic material having small continuous passages therethrough situated above said means for admitting hot oil into the top of said shell; and means for withdrawing vapor from above said mass.

14. A vapor separator comprising: a shell; means for admitting hot oil into the top portion of said shell; a series of foraminous members secured in said shell; means for distributing said incoming hot oil uniformly over said foraminous members; means for maintaining a body of residuum in the bottom of said shell below the lowest of said members; means for heating said body of residuum; a series of sleeve members, each centrally secured to one of said foraminous members and extending upwardly therefrom into a sleeve of the next higher foraminous member; means for artificially producing an upward draft through said sleeves; a mass of metallic material having small continuous passages therethrough situated above said means for admitting hot oil into the top of said shell; and means for withdrawing vapor from above said mass.

15. A vapor separator comprising: a shell; means for admitting hot oil into the top portion of said shell; a series of foraminous members secured in said shell; means for distributing said incoming hot oil uniformly over said foraminous members; means for maintaining a body of residuum in the bottom of said shell below the lowest of said members; means for heating said body of residuum; a series of sleeve members, each centrally secured to one of said foraminous members and extending upwardly therefrom into a sleeve of the next higher foraminous member; steam jets so situated as to produce an upward draft through said sleeves; a mass of metallic material having small continuous passages therethrough situated above said means for admitting hot oil into the top of said shell; and means for withdrawing vapor from above said mass.

16. A vapor separator comprising: a shell; means for admitting hot oil into the top portion of said shell; a series of foraminous members secured in said shell; means for distributing said incoming hot oil uniformly over said foraminous members; means for maintaining a body of residuum in the bottom of said shell below the lowest of said members; a steam pipe so placed as to inject steam into said body of residuum for heating said body of residuum; a series of sleeve members, each centrally secured to one of said foraminous members and extending upwardly therefrom into a sleeve of the next higher foraminous member; a mass of metallic material having small continuous passages therethrough situated above said means for admitting hot oil into the top of said shell; and means for withdrawing vapor from above said mass.

17. A vapor separator comprising: a shell; means for admitting hot oil into the top portion of said shell; a series of foraminous members secured in said shell; means for distributing said incoming hot oil uniformly over said foraminous members; means for maintaining a body of residuum in the bottom of said shell below the lowest of said members; a steam pipe so placed as to inject steam into said body of residuum for heating said body of residuum; a series of sleeve members, each centrally secured to one of said foraminous members and extending upwardly therefrom into a sleeve of the next higher foraminous member; means for artificially producing an upward draft through said sleeves; a mass of metallic material having small continuous passages therethrough situated above said means for admitting hot oil into the top of said shell; and means for withdrawing vapor from above said mass.

18. A vapor separator comprising: a shell; means for admitting hot oil into the top portion of said shell; a series of foraminous members secured in said shall; means for distributing said incoming hot oil uniformly over said foraminous members; means for maintaining a body of residuum in the bottom of said shell below the lowest of said members; a steam pipe so placed as to inject steam into said body of residuum for heating said body of residuum; a series of sleeve members, each centrally secured to one of said foraminous members and extending upwardly therefrom into a sleeve of the next higher foraminous member; steam jets so situated as to produce an upward draft through said sleeves; a mass of metallic material having small continuous passages therethrough situated above said means for admitting hot oil into the top of said shell; and means for withdrawing vapor from above said mass.

19. A vapor separator comprising: a shell; means for admitting hot oil into the top portion of said shell; a series of foraminous members secured in said shell; means for distributing said incoming hot oil uniformly over said foraminous members; a series of sleeve members, each centrally secured to one of said foraminous members and extending upwardly therefrom towards a sleeve of the next higher foraminous member so that said sleeves form a substantially continuous passageway centrally through said foraminous members, which passageway communicates with the spaces between adjacent pairs of foraminous members; and means for withdrawing vapor from the topmost of said sleeves.

20. A vapor separator comprising: a shell; means for admitting hot oil into the top portion of said shell; a series of foraminous members secured in said shell; means for distributing said incoming hot oil uniformly over said foraminous members; a series of sleeve members, each centrally secured to one of said foraminous members and extending upwardly therefrom towards a sleeve of the next higher foraminous member, so that said sleeves form a substantially continuous passageway centrally through said foraminous members, which passageway communicates with the spaces between adjacent pairs of foraminous members; means for artificially producing an upward draft through said sleeves; and means for withdrawing vapor from the topmost of said sleeves.

21. A vapor separator comprising: a shell; means for admitting hot oil into the top portion of said shell; a series of foraminous members secured in said shell; means for distributing said incoming hot oil uniformly over said foraminous members; a series of sleeve members, each centrally secured to one of said foraminous members and extending upwardly therefrom towards a sleeve of the next higher foraminous member so that said sleeves form a substantially continuous passageway centrally through said foraminous members, which passageway communicates with the spaces between adjacent pairs of foraminous members; steam jets so situated as to produce an upward draft through said sleeves; and means for withdrawing vapor from the topmost of said sleeves.

In testimony whereof, we have hereunto set our hands at Los Angeles, California, this 24 day of December, 1925.

FRANK A. MILLIFF.
JOHN A. MILLIFF.